US011169681B2

(12) United States Patent
Barnum et al.

(10) Patent No.: US 11,169,681 B2
(45) Date of Patent: Nov. 9, 2021

(54) REMOTE MANAGEMENT OF ON-SITE SMART WINDOW ACTIVITIES AND SCHEDULER OF SMART WINDOW EVENTS

(71) Applicant: Kinestral Technologies, Inc., Hayward, CA (US)

(72) Inventors: Walter Thomas Barnum, Salt Lake City, UT (US); Jason Aaron Litzinger, Salt Lake City, UT (US); William S. O'Dell, Kearns, UT (US)

(73) Assignee: KINESTRAL TECHNOLOGIES, INC., Hayward, CA (US)

( * ) Notice: Subject to any disclaimer, the term of this patent is extended or adjusted under 35 U.S.C. 154(b) by 0 days.

(21) Appl. No.: 16/814,162

(22) Filed: Mar. 10, 2020

(65) Prior Publication Data
US 2020/0293186 A1      Sep. 17, 2020

Related U.S. Application Data

(60) Provisional application No. 62/816,604, filed on Mar. 11, 2019.

(51) Int. Cl.
*G06F 3/048* (2013.01)
*G06F 3/0484* (2013.01)
(Continued)

(52) U.S. Cl.
CPC ............ *G06F 3/04847* (2013.01); *E06B 9/24* (2013.01); *G02F 1/163* (2013.01); *G06F 3/0482* (2013.01);
(Continued)

(58) Field of Classification Search
CPC .... G06F 3/048; G06F 3/0482; G06F 3/04847; G06F 16/22; E06B 9/24; E06B 9/68;
(Continued)

(56) References Cited

U.S. PATENT DOCUMENTS

| 7,894,944 B2 | 2/2011 | Liu et al. |
| 8,154,398 B2 | 4/2012 | Rolf et al. |

(Continued)

FOREIGN PATENT DOCUMENTS

| WO | 2013155467 A1 | 10/2013 |
| WO | 2018200740 A2 | 11/2018 |

OTHER PUBLICATIONS

PCT Application No. PCT/US20/22161, International Search Report and Written Opinion dated Jul. 27, 2020, 16 pages.

*Primary Examiner* — Haoshian Shih
(74) *Attorney, Agent, or Firm* — Lowenstein Sandler LLP

(57) ABSTRACT

A method includes receiving data from components of a smart window system and, responsive to determining that a first portion of the data corresponds to a first identifier, storing the first portion of the data in association with the first identifier. The method further includes receiving, via a graphical user interface (GUI) presented on a user device, a view request and, responsive to determining that the view request corresponds to the first identifier, retrieving the first portion of the data. The method further includes causing the GUI to be modified to display the first portion of the data and, responsive to user interaction with the GUI that was modified based on the view request, receiving, via the GUI presented on the user device, a change request to implement a change associated with electrochromic windows. The method includes causing a first component to implement the change associated with the electrochromic windows.

20 Claims, 5 Drawing Sheets

(51) Int. Cl.
*G06F 3/0482* (2013.01)
*E06B 9/24* (2006.01)
*G02F 1/163* (2006.01)
*G06F 16/22* (2019.01)

(52) U.S. Cl.
CPC ...... *G06F 16/22* (2019.01); *E06B 2009/2417* (2013.01); *E06B 2009/2464* (2013.01)

(58) Field of Classification Search
CPC ....... E06B 2009/2417; E06B 209/2464; G02F 1/15; G02F 1/163; G05B 23/02; G05B 15/02; G06Q 30/0206
See application file for complete search history.

(56) References Cited

U.S. PATENT DOCUMENTS

| | | | |
|---|---|---|---|
| 2010/0324962 A1* | 12/2010 | Nesler | G06Q 30/0206 |
| | | | 705/7.36 |
| 2015/0116811 A1 | 4/2015 | Shrivastava et al. | |
| 2016/0040478 A1* | 2/2016 | Lundy | E06B 9/68 |
| | | | 700/275 |
| 2017/0131610 A1* | 5/2017 | Brown | G05B 15/02 |
| 2018/0059520 A1 | 3/2018 | Dubois et al. | |
| 2018/0143501 A1 | 5/2018 | Nagel et al. | |
| 2019/0011798 A9 | 1/2019 | Brown et al. | |

* cited by examiner

Site Architecture — GUI 400A

| | | | | |
|---|---|---|---|---|
| ⌂ Location-Site | | | | Edit |
| Sensor Hub | Status | | Edit | Close |
| Range Extender | Status | | Edit | Close |
| Façade | | | Edit | Close |
| Interior Sensor | Status | | Edit | Close |
| Cabinet | | | Edit | Close |
|   Driver 1 | Status | | Edit | Close |
|   Driver 2 | Status | | Edit | Close |
|   Gateway | Status | | Edit | Close |
|   Distributed EMS | Status | | Edit | Close |
| Location 2 | | | Edit | Close |
|   Location 3 | | | Edit | Close |
|     Frame | | | Edit | Close |
|       EC Window 1 | Status | Mode | Tint Level | Edit | Close |
|       EC Window 2 | Status | Mode | Tint Level | Edit | Close |

FIG. 4A

Schedule — GUI 400B

| | 12am-8am | 8am-6pm | 6pm-12am | | |
|---|---|---|---|---|---|
| ⌂ Location-Site | | | | Edit | |
| Sensor Hub | Mode A | Mode B | Mode C | Edit | Close |
| Range Extender | Mode A | Mode B | Mode C | Edit | Close |
| Façade | | | | Edit | Close |
| Interior Sensor | Mode A | Mode B | Mode C | Edit | Close |
| Cabinet | | | | Edit | Close |
|   Driver 1 | Mode A | Mode B | Mode C | Edit | Close |
|   Driver 2 | Mode A | Mode B | Mode C | Edit | Close |
|   Gateway | Mode A | Mode B | Mode C | Edit | Close |
|   Distributed EMS | Mode A | Mode B | Mode C | Edit | Close |
| Location 2 | | | | Edit | Close |
|   Location 3 | | | | Edit | Close |
|     Frame | | | | Edit | Close |
|       EC Window 1 | Mode A | Mode B | Mode C | Edit | Close |
|       EC Window 2 | Mode A | Mode B | Mode C | Edit | Close |

FIG. 4B

REMOTE MANAGEMENT OF ON-SITE SMART WINDOW ACTIVITIES AND SCHEDULER OF SMART WINDOW EVENTS

RELATED APPLICATIONS

This application claims the benefit of U.S. Provisional No. 62/816,604, filed Mar. 11, 2019, the entire contents of which are incorporated by reference.

BACKGROUND

An electrochromic glass unit uses electrochromic glass that can change transmissivity with the application of electric current and voltage. The change of transmissivity typically relies on a reversible oxidation of a material. Electrochromic glass units can darken at the press of a button or other triggering events and are also often used in automobile rearview mirrors to reduce reflective glare.

BRIEF DESCRIPTION OF DRAWINGS

The present disclosure will be understood more fully from the detailed description given below and from the accompanying drawings of various embodiments, which, however, should not be taken to limit the present disclosure to the specific embodiments, but are for explanation and understanding only.

FIGS. 4A-B are graphical user interfaces (GUIs) for cloud-based remote management of an electrochromic window system, according to certain embodiments.

DETAILED DESCRIPTION

Figure 1:
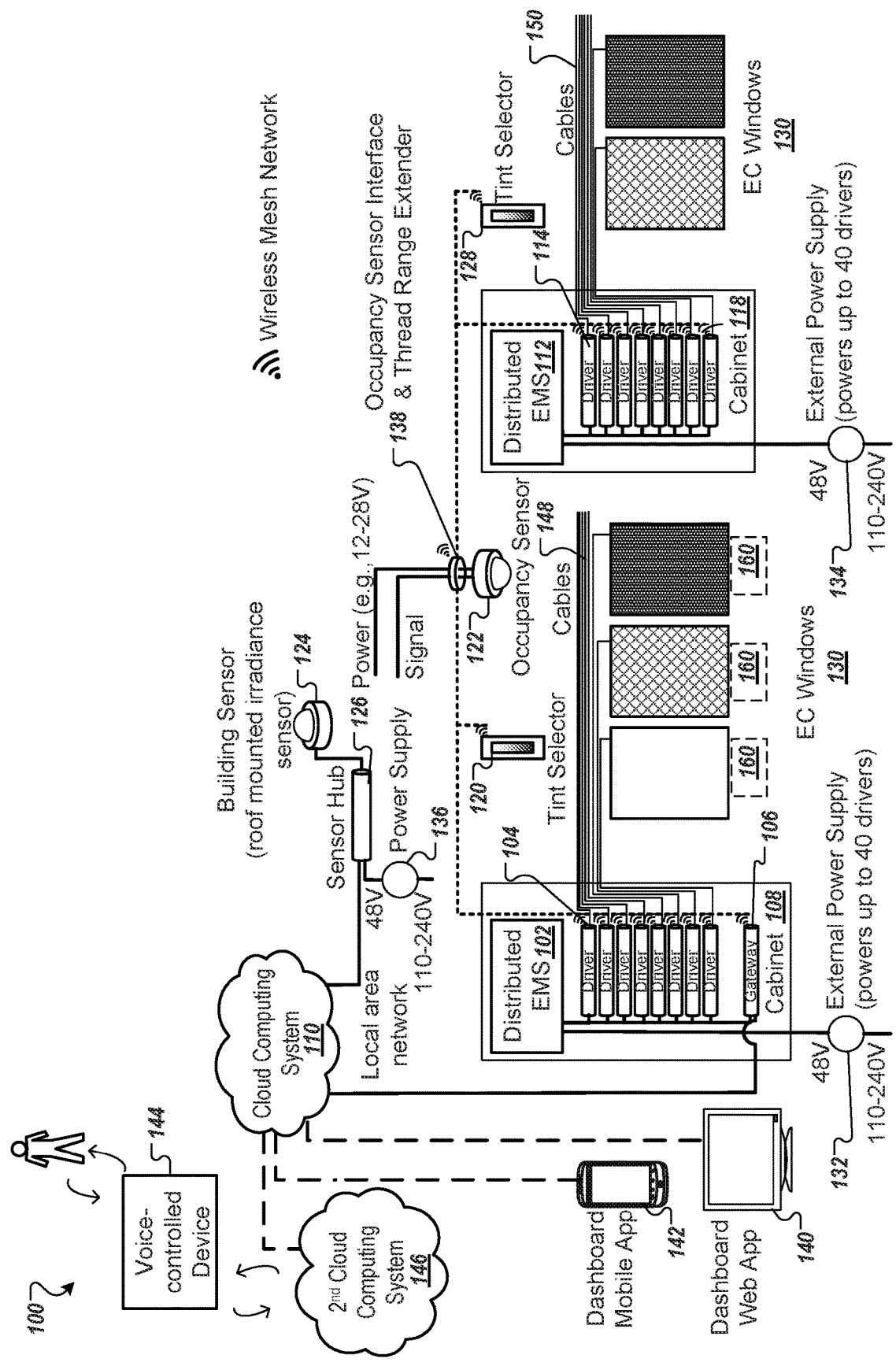
FIG. 1 is a block diagram of an electrochromic window system, according to certain embodiments.

Remote management of on-site smart window activities and scheduler of smart window events are described. Electrochromic devices can be, for example, used for smart windows in a commercial or residential building. A smart window refers to one or more glass units whose characteristics (e.g., a tint level representing a particular transmissivity parameter, reflective glare, etc.) can be changed automatically (e.g., at a particular time, in response to a weather condition, etc.). A modern multi-story building can include thousands of external and internal windows. As such, controlling electrochromic devices in an efficient manner becomes increasingly important.

Conventional systems typically use local computers to control electrochromic devices via one or more local networks. However, the use of local computers has several deficiencies. Firstly, the local computer may transmit instructions to cause the drivers to control the electrochromic devices and the local computer may receive data from components (e.g., drivers, etc.) in the local system. A user may attempt to use the local computer to analyze the instructions transmitted and the data received to improve functionality of the local system. The local computer may be limited to improving functionality of the local system based on data from components of the local system. The local computer sending instructions, receiving data, and performing analytics may cause an increased amount of processor overhead, required bandwidth, and energy consumption for the local computer. This may cause the local computer to have a lagged response to user input to change the tint level of electrochromic devices, perform analytics, etc. Also, the amount of instructions sent and data received accumulate over time, occupying more and more memory storage until portions of the instructions and data are to be discarded (e.g., upon achieving maximum memory storage capacity). More time, processor overhead, and energy consumption may be used to find specific types of instructions and data in the vast amounts of instructions sent and data received. In addition, managing and troubleshooting of components of the local system may be manual and laborious. To manage and evaluate performance of a local system, a user may need to access the local computer on-site.

Aspects of the present disclosure address the deficiencies of conventional systems by providing remote management of on-site smart window activities and scheduler of smart window events. A server device (e.g., of a cloud computing system) may receive data from components (e.g., drivers, gateway, sensor hub, etc.) of a smart window system. The server device may receive, via a GUI presented on a user device, a view request corresponding to a first portion of the data (e.g., sensor data, component status, tint level, etc.). The server device may cause the first portion of the data to be displayed via the GUI presented on the user device. The server device may receive, via the GUI presented on the user device, a change request to implement a change (e.g., change tint level, change settings, change schedule, etc.) associated with one or more electrochromic windows of the smart window system. The server device may cause a first component (e.g., gateway, sensor hub, etc.) to implement the change associated with the one or more electrochromic windows of the smart window system. For example, the server device may cause a gateway to direct one or more drivers to change a corresponding tint level of one or more electrochromic windows. In another example, the server device may cause a gateway associated with the one or more electrochromic windows to change one or more settings (e.g., configurations, schedule, etc.) of the gateway. As used herein, server device may refer to a single server device or multiple server devices.

Aspects of the present disclosure result in technological advantages of significant reduction in energy consumption (e.g., battery consumption), required bandwidth, processor overhead, and so forth. In some embodiments, the technological advantages result from providing remote management via a cloud computing system (e.g., server device) of on-site smart window activities. A server device of the cloud computing system may not be limited to data from components of a local network (e.g., a local wireless mesh network). Instead, the server device may use data from different smart window systems (e.g., coupled to a respective gateways) to improve functionality of more than one smart window system coupled to the server device. The server device may store different portions of the data in different databases for efficient retrieval (e.g., less processor overhead, needed bandwidth, and energy consumption) for future analysis and display. The server device may perform analysis on data from different databases and use the analysis to improve functionality of more than one electrochromic systems. By performing analysis on the server device, the gateway may cause drivers to control tint levels of the electrochromic devices without the lag of conventional systems. By providing remote management of components electrochromic systems via a GUI, the server device may allow for remote scheduling, visibility, troubleshooting, etc. of the components of electrochromic systems.

FIG. 1 is a block diagram of an electrochromic window system 100 (e.g., smart window system) that performs cloud-based remote management, according to one embodiment. The electrochromic window system 100 includes a first cabinet 108 in which a first distributed energy management system (EMS) 102, a first set of drivers 104, and a gateway 106 are located. In an alternate embodiment, the drivers 104 may be integrated drivers where one or more drivers are integrated into the EC windows. Each of the set of drivers 104 is coupled to an individual one of a set of electrochromic (EC) windows 130. Alternatively, other electrochromic devices can be driven by the set of drivers 104. The set of drivers 104 are coupled to the set of EC windows 130 via power cables 148 and control wires. The cabinet 108 can be a standard size, such as 28", 42", or 60". The cabinet 108 can be located in proximity to the EC windows 130 or located away from the EC windows 130, such as up to 300 feet. The cabinet 108 can be located in a location that reduces wiring costs. Between each driver and EC window there may be one or more power cables 148 coupled to an anode of the EC window and one or more power cables 148 coupled to a cathode of the EC window. There may be two control wires for sensing the voltage of the EC window (referred to herein as sense voltage or Vsense) and two wires for sequestration operations, as described herein. In one embodiment, each driver of the set of drivers 104 can supply up to 8 amps to each EC window of the set of EC windows 130. An external power supply 132 is coupled to provide external power to the distributed EMS 102, the set of drivers 104, and the gateway 106 within the first cabinet 108. For example, 16 AWG 2 conductor plenum cables can provide lower voltage (48V) or higher voltage (110-240V) to the first cabinet 108. The external power supply 132 can be located in proximity to the first cabinet 108 or farther away from the first cabinet 108, such as up to up to hundreds of feet or up to 1000 feet. In some embodiments, the external power supply 132 is configured to supply less than 25% of a maximum power used by the set of EC windows 130 during switching of one or more of the set of EC windows 130. Additional external power supplies can be used to power the components in the first cabinet 108. The external power supply 132 may be a conventional power supply connected to the power grid or it may be a building battery such as the residential batteries built by Tesla (the Powerwall battery) or LG Chem's RESU battery that obtain energy from a source such as on-site solar energy cells. The external power supply 132 may be a combination of the power grid and a building battery.

Although portions of the present disclosure describe the electrochromic window system 100 in relation to a distributed EMS, the electrochromic window system 100 may include one or more different types of power sources (e.g., a battery, a local power source inside of a driver, a multi-device boost power supply, etc.) in addition to or instead of the distributed EMS.

In some embodiments, a driver for an EC window may be integrated into the EC window itself in either the frame of the window, in the integrated glass unit (IGU) of the EC window, or in the laminated glass unit (LGU) of the EC window.

Each EC window may include an electrochromic panel (e.g., glass or film) that can change transmissivity with the application of electric current and voltage. The change of transmissivity typically relies on a reversible oxidation of a material. Electrochromic units can darken at the press of a button (e.g., user input via tint selector 120 or 128, dashboard web app 140, dashboard mobile app 142, etc.) or in response to an automatic triggering event and are also often used in automobile rearview mirrors to reduce reflective glare. In some embodiments, upon receiving user input via the tint selector 120 to tint a first EC window associated with a first driver, the tint selector 120 may transmit instructions to the first driver and the first driver may control the tint level of the EC window. In some embodiments, upon receiving user input via a user device to tint a first EC window associated with a first driver, dashboard web app 140 or dashboard mobile app 142 (e.g., executing on the user device) may transmit the user input to the cloud computing system 110, the cloud computing system 110 may transmit the user input to the gateway 106, and the gateway 106 may transmit the user input to the first driver to cause the first driver to control the tint level of the first EC window. The different transmissivities of the EC windows may be referred to as tint levels (e.g., 0% tint level is 65% transmissivity, 50% tint level is 21% transmissivity, 100% tint level is 2% transmissivity, etc.).

In some embodiments, one or more power sources (e.g., the distributed EMS, a battery, a local power source inside of a driver, a multi-device boost power supply, etc.) may provide additional power (e.g., boost power) to an electrochromic device (e.g., EC window 130) that can be supplied by a main power supply. The one or more power sources may support a varied number of EC windows based on geometry and size of the EC windows, how often the EC windows are tinted, as well as how low other power sources (e.g., the batteries of the distributed EMS 102) can be discharged.

Each power source (e.g., distributed EMS 102) may supply power to the set of drivers 104 according to a power state of the set of EC window 130, as well as the power state of other power sources (e.g., multi-device boost power supply 208). For example, the distributed EMS 102 can supply a first amount of power to the set of drivers 104 from an external power supply interface in an idle state of the set of EC windows 130. Alternatively, the distributed EMS 102 does not supply power to the set of EC windows 130 in the idle state. In some embodiments the idle power level of an EC window may be zero, for example when the type of EC device used only requires power to switch from one optical transmission state to another optical transmission state. The power state information (e.g., idle state, tinted state, transitioning between states, etc.) may be provided to the gateway 106 and may be shared with the cloud computing system 110.

The additional power provided by the one or more power sources can enable fast and uniform switching in a variety of conditions, and in particular when the EC window 130 includes a gradient conductive layer.

An EC window 130 including a gradient transparent conductive layer can have very fast switching speed (e.g., less than 5 minutes, or less than 10 minutes) as well as uniform transitions between states (e.g., where the clear state, dark state and all tinted states have delta E across the area of the panel less than 10) by including one or more gradient transparent conductive layers in each EC device or panel. The term "gradient transparent conductive layer" refers to an electrically conducting layer with spatially varying sheet resistance, or resistance to current flow substantially parallel to a major surface of the layer, that varies as a function of position within the electrically conductive layer. The gradient transparent conductive layer or layers also enable the driving of an EC window 130 incorporating such a layer at much higher voltages so that high amounts of power are required initially to drive fast switching. The gradient transparent conductive layer may be a patterned or graded transparent conductive oxide (TCO) such as indium titanium oxide and tantalum tin oxide. In other embodiments, the distributed EMS 102 can be used in connection with drivers that drive other types of EC windows 130. Additionally, the distributed EMS can be used to drive multi-panel electrochromic windows that include more than one EC window 130 connected in series or parallel. A multi-panel electrochromic window may be one where the EC windows 130 are stacked over one another to provide very low transmissivity of light through the devices, for example less than 1% transmissivity of light or less than 0.1% transmissivity of light. Alternatively the multi-panel electrochromic windows may be "tiled" adjacent to one another such that more than one EC window 130 is laminated to a carrier glass substrate to form larger sized windows. In another embodiment a single driver may be used to drive multiple electrochromic windows that may be in a group of electrochromic windows. For example a single driver may drive two or more electrochromic windows.

The gateway 106 is operatively coupled to a cloud computing system 110. A cloud computing system refers to a collection of physical machines (e.g., server devices), that host applications providing one or more services to multiple components (e.g., gateway 106, sensor hub 126, drivers 104, distributed EMS 102, user devices executing dashboard mobile app 142 or dashboard web app 140, etc.) via a network. In some implementations, the applications hosted by cloud computing system 110 may provide services (e.g., scheduling, viewing, remote management, glare control, etc.) to users accessing the cloud computing system 110 via a network. The applications may allow users to manipulate (e.g., access, create, edit, store, delete, share, collaborate, print, etc.) electronic documents (e.g., schedules, rules, configurations, glare control, etc.). The cloud computing system 110 may include one or more server devices and one or more data stores. The cloud computing system 110 may include a cloud-based remote management module 224 (see FIG. 2). The cloud-based remote management module 224 may include one or more applications, one or more server devices, etc. The gateway 106 can be hardwired (e.g., via Ethernet) to a network device of a local area network, to gain access to a private or public network to access the cloud computing system 110. The gateway 106 can communicate with the cloud computing system 110 over Cat 5 wiring using the TCP/IP protocol with TLS (SSL) for secure communications. The gateway 106 can communicate with the cloud computing system 110 using secure communications, such as using IPV4, IPv6, or Transport Layer Security (TLS) networking protocols. The cloud computing system 110 can provide control logic, glare control (e.g., cause tint level of the EC windows 130 to be set to avoid glare), and configuration for the electrochromic window system 100. The cloud computing system 110 may receive information (e.g., via one or more application programming interfaces (APIs), weather information, etc.) for providing glare control, etc. The cloud computing system 110 may determine which EC windows 130 each device (e.g., tint selector 120 or 128, gateway 106, etc.) and each application (e.g., dashboard mobile app 142, dashboard web app 140, etc.) is authorized to view and/or control and the priority of control. For example, the cloud computing system 110 may determine that the tint selector 120 is authorized to control EC windows 130 that are connected to drivers 104. In another example, the cloud computing system 110 may determine that the dashboard mobile app 142 logged in by a first user is authorized to view and control only the first window of the EC windows 130. During configuration (e.g., commissioning, set-up by an administrator), the cloud computing system 110 may receive instructions of which users and which devices are authorized to control which EC windows 130. In some embodiments, the cloud computing system 110 may authorize access by components (e.g., tint selectors 120 and 128, gateway 106, etc.) to a wireless mesh network (e.g., during commissioning or set-up) and once authorized, subsequent access of the wireless mesh network is not dependent on further authorization (e.g., components are authorized during commissioning or set-up and do not need further authorization to continue accessing).

In some embodiments, the cloud computing system 110 may use machine learning to provide control of the EC windows 130. In some embodiments, the cloud computing system 110 may include a broker module to receive data from the gateway 106, sensor hub 126, etc. (e.g., for providing glare control, for providing data visibility) and to transmit data to other gateways 106. In some embodiments, control of the EC windows 130 may be distributed over the cloud computing system 110 and the gateway 106. For example, the cloud computing system 110 may provide settings files (e.g., a schedule, rules, etc.) to the gateway 106 and the gateway 106 may control the EC windows 130 based on the settings files. The cloud computing system 110 may send additional instructions to the gateway 106 to deviate from the settings files in controlling the EC windows 130 (e.g., responsive to the cloud computing system 110 receiving user input via a dashboard mobile app 142, sensor data via the sensor hub 126, the gateway 106 may provide a conduit for control of the EC windows 130, etc.)

The cloud computing system 110 can provide automation algorithms, data analytics, user management, security protocols, and the like. The cloud computing system 110 can provide extensive system health monitoring and proactive troubleshooting, as well as provide third-party integration without complicated on-site technical support. The cloud computing system 110 can provide a system dashboard to a dashboard web app 140 on a desktop computer, a dashboard mobile app 142 on a personal computing device, or both. The dashboard web app 140 and the dashboard mobile app 142 can be used to monitor or control the electrochromic window system 100. The dashboard web app 140 and the dashboard mobile app 142 are applications that may be executed on one or more user devices. For example, the dashboard mobile app 142 may execute on a mobile user device, such as a smart phone or a tablet. The dashboard web app 140 may execute on a desktop, laptop, etc. The dashboard web app 140 or the dashboard mobile app 142 (executing on a user device) may receive user input (e.g., selection of one or more EC windows and a tint level) via the user device and may transmit the user input to the cloud computing system 110. Responsive to determining that the user input is a request to view information (e.g., monitor current status of components, current mode of EC windows 130, etc.), the cloud computing system 110 may retrieve the information and transmit the information to the user device to cause the dashboard web app 140 or dashboard mobile app 142 to display the requested information. Responsive to determining that the user input is a request to change operation of one or more components of the electrochromic window system 100, such as a request to tint a first EC window associated with a first driver, the cloud computing system 110 may transmit the user input to the gateway 106, the gateway 106 may transmit the user input to the first driver, and the first driver may control the tint level of the first EC window based on the user input.

The cloud computing system 110 can also interact with other devices or networks, such as with a second cloud computing system 146, as illustrated in FIG. 1, that communicates with a voice-controlled device 144. For example, the voice-controlled device 144 may receive audible commands from a user to control or get a report of the electrochromic window system 100. The dashboard web app 140 and the dashboard mobile app 142 can communicate with the cloud computing system 110 using the TCP/IP protocol with TLS (SSL) and using encryption and authentication for secure communications. The cloud computing system 110 can include a microservice architecture (e.g., application architecture) that is exposed through APIs to manage interaction with onsite components, such as the gateways, drivers, and tint selectors. The cloud computing system 110 can eliminate complicated onsite networking requirements, as the external control occurs through the APIs. The cloud computing system 110 can provide centralized data aggregation from all deployments to facilitate automation and analytics. The centralized data aggregation of the cloud computing system 110 may also include data from the manufacturing, testing, and assembly of the EC Windows 130 and any associated hardware of the electrochromic window system 100 (e.g. drivers 104, gateways 106, etc.). The cloud computing system 110 can leverage various authentication and authorization technologies to secure site access. The cloud computing system provides a robust platform that facilitates on-demand load scaling and health monitoring. The cloud computing system 110 can also provide a better path for onsite workload migration, backed by a robust central cloud store.

As described above, the gateway 106 communicates directly with the cloud computing system 110 through secured channel(s). The gateway 106 communicates with the cloud computing system 110 on behalf of the set of drivers 104 and the distributed EMS 102. The gateway 106, the set of drivers 104, and the distributed EMS 102 communicate with each other over wireless connections, such as over a secure thread wireless network. For example, each of these components can communicate using IEEE 802.15.4, 2.4 GHz, IPv6 mesh network routing (thread). These communications can be encrypted with 128-bit AES encryption. Alternatively, other mesh networks can be used, as well as other frequencies, and encryption techniques.

It should be noted that, after the drivers and the distributed EMS are configured via the gateway, the distributed EMS and driver behavior is not dependent on the gateway for safe operation. That is, the gateway can be disconnected and the drivers will not drain the batteries of the distributed EMS.

As illustrated in FIG. 1, the electrochromic window system 100 may include additional devices, such as a tint selector 120, an occupancy sensor 122, an occupancy sensor interface and thread range extender 138, a building sensor 124 (e.g., roof mounted irradiance sensor), and a sensor hub 126.

The sensor hub 126 can be powered by an external power supply 136 and can be hardwired to the local area network, much like the gateway 106.

The occupancy sensor interface, thread range extender 138, and occupancy sensor 122 can be powered by an external power supply and can send or receive signals to or from a lighting system or a building management system (BMS). The tint selector 120 and occupancy sensor interface and thread range extender 138 can communicate with other devices on the wireless mesh network.

The tint selector 120 can be a device that is mounted on a wall where a user can activate a transition of one or more EC windows 130. The tint selector 120 can be mounted or otherwise disposed in a building having the EC windows 130 to permit user control of one or more EC windows 130 (e.g., the set of EC windows). The tint selector 120 can be programmed to be part of group of EC windows (e.g., a set of windows that are to be set at the same tint level, e.g., all EC windows in the group tinted 50%). That is the tint selector 120 can be associated with the set of drivers 104 and the gateway 106. Alternatively, the tint selector 120 can be associated with a scene of one or more EC windows. Upon receiving user input (e.g., via the tint selector 120) for EC windows to be tinted in a scene, one or more first EC windows of the scene are to be tinted at a first tint level and one or more second EC windows of the scene are to be tinted at a second tint level (e.g., all EC windows of the scene are to be tinted 100% except for one EC window of the scene that is to be tinted 50%). Upon receiving user input, the tint selector may transmit (e.g., multicast) a signal to the corresponding drivers to cause the EC windows to change tint level. The tint selector may also transmit the user input to the gateway 106 to cause the gateway to transmit the user input to the cloud computing system 110.

The electrochromic window system 100 can include one or more additional tint selectors, such as illustrated in FIG. 1 by a second tint selector 128 that is also wirelessly coupled to the wireless mesh network. The second tint selector 128 can be associated with the same group or scene as the tint selector 120. Alternatively, the second tint selector 128 can be associated with a different group or a different scene as the tint selector 120.

In a further embodiment, the electrochromic window system 100 can include one or more cabinets, such as illustrated in FIG. 1 with a second cabinet 118. The second cabinet 118 can include a second distributed EMS 112 and a second set of drivers 114. In some cases, the second cabinet 118 does not include a second gateway and the gateway 106 manages the second set of drivers 114 as well. An external power supply 134 is coupled to provide external power to the second distributed EMS 112 and the second set of drivers 114 within the second cabinet 118. For example, 16 AWG 2 conductor plenum cables can provide lower voltage (48V) or higher voltage (110-240V) to the second cabinet 118. The external power supply 134 can be located in proximity to the second cabinet 118 or farther away from the second cabinet 118, such as up to 350 feet. In other cases, more than two cabinets may be used. It should also be noted that additional external power supplies can be used to power the components in the cabinet 108 and the second cabinet 118.

Each component of the electrochromic window system 100 can be designed to automatically obtain critical operating data from the cloud computing system 110 to avoid a single failure requiring significant maintenance downtime. Although various components are illustrated in FIG. 1, in other embodiments, the electrochromic window system 100 may include more or less components than as illustrated in FIG. 1.

In another embodiment, the electrochromic window system 100 includes drivers 160 located at each of the set of EC windows 130, instead of or in addition to the set of drivers 104 in the first cabinet 108. In some cases, each EC window 130 has a driver 160, as illustrated. In other cases, a single driver 160 can drive multiple EC windows 130. The drivers 160 can be coupled to an external power supply. The external power supply can be located at the EC window 130 or in close proximity. In this case, the external power supplies for the set of EC windows 130 can be considered to be distributed, instead of centralized as described above. In other cases, the drivers 160 do not use an external power supply.

It should be noted that various embodiments described herein are described with respect to a commercial installation. In other embodiments, the electrochromic window system 100 can be deployed in a residential installation. In those cases, there may be modifications to the electrochromic window system 100 as described above to accommodate differences between the commercial installation and the residential installation.

In some embodiments (e.g., residential installations), one or more of the components of the electrochromic window system 100 may be combined. For example, one piece of hardware may include a gateway and two or more electrochromic windows (e.g., hardware that includes a gateway and one or more drivers). In some embodiments (e.g., residential installations), the gateway may transmit data less frequently and/or transmit less data. In some examples, the gateway transmits data at a predetermined point in time (e.g., without transmitting a subset of the data stream immediately). In some examples, the gateway discards a subset of the data stream (e.g., does not store the subset in the file (data file) to be transmitted to the server device. In some examples, the gateway stores the data stream or a subset of the data stream locally (e.g., instead of transmitting the data stream to the server device). In some embodiments, the gateway transmits a subset of the data stream to the server device responsive to a request (e.g., specifying particular types of events, errors, malfunctions, etc.) from the server device (e.g., otherwise the gateway stores and/or discards data). In some embodiments, the gateway dynamically configures what data is transmitted (e.g., based on bandwidth, storage, cost, etc.). In some embodiments, the gateway transmits and/or stores the data that changes (e.g., changes over time, varies from a schedule, that is not redundant, changes from last state of interest, reportable change, anomalous behavior, manually overriding a tinting schedule, etc.).

In some embodiments, one or more of a corresponding tint selector 120, driver 104, one or more EC windows 130, occupancy sensor, etc. are located in each unit (e.g., townhome, apartment, portion of prefabricated building, portion of modular building) and a common gateway 106 is located in a central location (e.g., hallway, mechanical room, etc.). Thread range extenders may be used for the common gateway 106 to communicate with the other components. A user may have access to a user account and a tint selector that only control EC windows 130 corresponding to the unit to which the user has access.

In some embodiments, one or more components (e.g., gateway 106, sensor hub 126, etc.) of the electrochromic window system 100 may have two or more network connections. In some examples, two or more wired network connections (e.g., each corresponding to a different network) may be routed to the same component. In some examples, a wired network connection and a wireless network connection (e.g., each corresponding to a different network) may be provided to the same component. In some examples, two or more wireless network connections (e.g., each corresponding to a different network) may be provided to the same component. A first network may be a primary network (e.g., cable network, Ethernet network, etc.) and a second network may be a cell modem backup network (e.g., integrated cellular modular in the cabinet). The cabinet 108 may have a router for receiving the different network connections. The one or more networks to which components of the electrochromic window system 100 are connected may be separate from other building networks.

In some embodiments, one or more components (e.g., gateway 106, sensor hub 126, etc.) of the electrochromic window system 100 transmit and receive data via the network that is functioning (e.g., if the primary network is down, the cell modem backup network is used). In some embodiments, one network (e.g., cable network) has a lower price than a backup network (e.g., cell modem backup network). The components of the electrochromic window system 100 may send higher priority data via whichever network is functioning and may wait until the lower-price network is functioning to transmit lower priority data. In some embodiments, one or more components (e.g., gateway 106, sensor hub 126, etc.) of the electrochromic window system 100 are aware of which network connection is functioning. In some embodiments, one or more components (e.g., gateway 106, sensor hub 126, etc.) of the electrochromic window system 100 transmit a message to the cloud computing system 110 (e.g., requesting via which network the cloud computing system 110 is receiving the message) and the cloud computing system 110 may provide a response indicating via which network (e.g., hardwired network or cellular network) the message was received. The component of the electrochromic window system 100 may determine which network is functioning based on the response.

In some embodiments, one or more components of the electrochromic window system 100 use wireless power (e.g., wireless power transfer (WPT), non-wired power). The wireless transfer of power may be via induction (e.g., electromagnetic induction, inductive coupling of magnetic fields, non-radiative induction), resonance (e.g., radiative electromagnetic resonance, resonance induction), radio frequency (RF) power transfer (e.g., uncoupled RF wireless power transfer), microwave power transfer, and/or laser power transfer. For example, a driver may wirelessly transmit power to an EC window 130.

In some embodiments, one or more of the EC windows 130 are photovoltaic (PV) windows (e.g., PV EC windows) that include a PV coating coupled to a battery. The PV coating may collect energy from the sun and charge the battery. The battery, wireless power, and/or an external power supply (e.g., via one or more drivers, via distributed EMS, etc.) may be used to tint the EC window (e.g., the battery may be used first and then one or more drivers may be used as a backup power supply).

Figure 2:
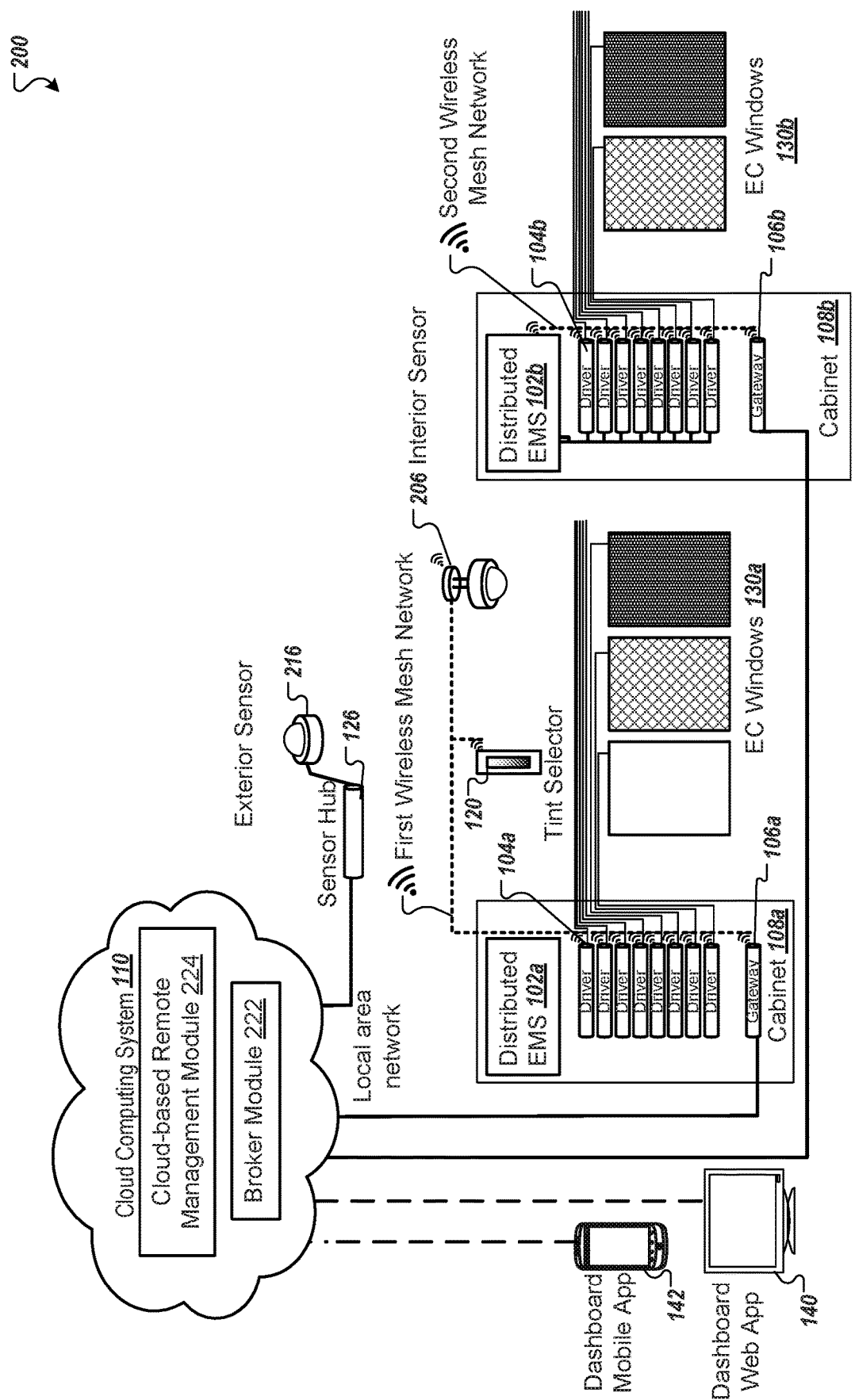
FIG. 2 is a block diagram of an electrochromic window system including a cloud-based remote management module, according to certain embodiments.

FIG. 2 is a block diagram of an electrochromic window system 200 (e.g., smart window system) including a cloud-based remote management module 224 and a broker module 222, according to certain embodiments. Components with the same reference number as those in FIG. 1 may include similar or the same functionalities as those described in relation to FIG. 1. One or more modules, functionalities, data stores, etc. of cloud computing system 110 may be provided by a third party service. In some embodiments, the broker module 222 may be provided by a third party (e.g., a third party on-demand cloud computing platform provider). In some embodiments, the broker module 222 is provided by the same entity that provides the cloud-based remote management module 224. In some embodiments, the cloud-based remote management module 224 is a single module that operates on the cloud computing system 110. In some embodiments, the cloud-based remote management module 224 includes two or more modules (e.g., two or more microservices, two or more applications). In some embodiments, the cloud-based remote management module 224 includes two or more modules (e.g., two or more microservices). For example, the cloud-based remote management module 224 (e.g., logic, schedules, trained machine learning model, a retrained machine learning model, etc.) may be deployed at the gateway 106. Components of the electrochromic window system 200 may have a wired and/or wireless connection to one or more other components of the electrochromic window system 200. For example, the gateway may have a wired and/or wireless connection to one or more of the distributed EMS 102, one or more drivers 104, sensor hub 126, exterior sensor 216, interior sensor 206, tint selector 120, and/or one or more EC windows 130. Each of the components of the electrochromic window system 200 may have one or more wireless interfaces, one or more wired interfaces, or any combination thereof. For example, one or more components of the electrochromic window system 200 may include one or more radios, one or more wired transceivers (e.g., Universal Asynchronous Receiver/Transmitter (UART), power line communication (PLC) transceiver), or the like. One or more components (e.g., drivers 104, the gateway 106, the tint selector 120, or the like) of the electrochromic window system 200 may communicate over one or more wired connections or even over power lines.

One or more modules, functionalities, data stores, etc. of cloud computing system 110 may be provided by a third party service. In some embodiments, the broker module 222 may be provided by a third party (e.g., a third party on-demand cloud computing platform provider). In some embodiments, the broker module 222 is provided by the same entity that provides the cloud computing module 224. In some embodiments, the cloud-based remote management module 224 is a single module that operates on the cloud computing system 110. In some embodiments, the cloud-based remote management module 224 may include one or more applications and one or more servers.

The electrochromic window system 200 may include the cloud computing system 110 and components including one or more of drivers 104, one or more gateways 106, EC windows 130 (e.g., PV EC windows, battery coupled to PV coating, etc.), distributed EMS 102, tint selector 120, interior sensors 206, sensor hub 126, exterior sensors 216, etc. The cloud computing system 110 may include the cloud-based remote management module 224 and the broker module 222. The cloud-based remote management module 224 may identify, send instructions to, and receive data from the components of the electrochromic window system 200 (e.g., via broker module 222).

The cloud computing system 110 is coupled to one or more gateways 106, a sensor hub 126, a dashboard web app 140, and a dashboard mobile app 142. Each gateway 106 may be coupled via a corresponding wireless mesh network to drivers 104, interior sensors 206 (e.g., occupancy sensor 122, occupancy sensor interface and thread range extender 138, etc.), one or more tint selectors 120, and the distributed EMS 102. The gateway 106 may include characteristics of one or more of a hub, proxy, or aggregator. A sensor hub 126 may be coupled to one or more exterior sensors 216. The drivers 104, distributed EMS 102, tint selector 120, and interior sensors 206 may be disposed proximate the gateway 106 (e.g., within the building, within range of the wireless mesh network, etc.). The interior sensors 206 may include one or more of interior light sensors, a sensor on a window to collect EC window 130 transmittance data, sensors to collect photographic data from interior of building, occupancy sensors, etc. The exterior sensors 216 may be disposed proximate sensor hub 126 (e.g., proximate the roof of the building, on the roof, proximate the edge of the roof, etc.). The exterior sensors 216 may include one or more of light sensors on the sides of buildings, temperature and/or humidity sensors, sensors (or cameras) to collect photographic data of cloud cover (or irradiance), irradiance sensor, rooftop pyranometer sensor (e.g., measure total global irradiance, measure diffuse horizontal irradiance (shadowed light, diffuse horizontal irradiance (DHI)), calculate direct normal irradiance, include non-visible spectrum), etc. DHI may refer to the terrestrial irradiance received by a surface (e.g., horizontal surface) which has been scattered or diffused by the atmosphere. DHI may be a component of global horizontal irradiance which may not come from the beam of the sun (e.g., beam may be about a 5-degree field of view concentric around the sun).

In some embodiments, a sensor (e.g., interior sensor 206, exterior sensor 216) transmits sensor data to the gateway 106. For example, one or more exterior sensors 216 (e.g., camera, temperature sensor, illuminance sensor, humidity sensor, pressure sensor, rain sensor, or the like) may be mounted on the roof and may transmit data (e.g., sensor data, images, etc.) to the gateway 106. In some embodiments, an exterior sensor 216 is coupled (e.g., wirelessly, wired, etc.) with the gateway 106 (e.g., without use of a sensor hub 126). In some embodiments, an exterior sensor 216 communicates with cloud computing system 110 (e.g., without use of a sensor hub 126, without use of gateway 106). In some embodiments, a sensor (e.g., interior sensor 206, exterior sensor 216) has a wireless module to be able to communicate with the cloud computing system 110 and/or other components (e.g., sensor hub 126, gateway 106, etc.). In some embodiments, one or more exterior sensors 216 and a sensor hub 126 may be integrated into a single component that has the functionalities of exterior sensors 216 and the sensor hub 126.

Each gateway 106 may be coupled, via a corresponding wireless mesh network, to corresponding drivers 104 that control corresponding EC windows 130. For example, gateway 106a may be coupled, via a first wireless mesh network, to drivers 104a that control EC windows 130a and gateway 106b may be coupled, via a second wireless mesh network, to drivers 104b that control EC windows 130b (e.g., the EC windows 130 span more than one wireless mesh network). The drivers 104a may be coupled to a gateway 106a and drivers 104b to gateway 106b because of capacities (e.g., capacity of each gateway 106, cabinet 108, distributed EMS 102, wireless mesh network, etc.), length of cables, etc.

The cloud-based remote management module 224 may transmit instructions to components of the electrochromic window system 200. In some embodiments, the cloud-based remote management module 224 transmits instructions to the gateway to cause tint level of EC windows 130 to be changed. In some embodiments, the cloud-based remote management module 224 transmits instructions to the gateway to request information (e.g., status of components, tint level of EC windows, etc.). In some embodiments, the cloud-based remote management module 224 transmits instructions to the gateway to cause software or firmware updates of the gateway or components coupled to the gateway. In some embodiments, the cloud-based remote management module 224 transmits instructions to the gateway to provide a one or more of a schedule, mode, settings, or configurations for a component.

In some embodiments, the cloud-based remote management module 224 transmits instructions to the sensor hub to request information (e.g., sensor values, status of exterior sensors, etc.). In some embodiments, the cloud-based remote management module 224 transmits instructions to the sensor hub to cause software or firmware updates of the sensor hub. In some embodiments, the cloud-based remote management module 224 transmits instructions to the sensor hub to provide a one or more of a schedule, mode, settings, or configurations for the sensor hub (e.g., only send sensor data during daylight hours, etc.).

The cloud-based remote management module 224 may receive data from components of the electrochromic window system 200. The cloud-based remote management module 224 may receive sensor data from exterior sensors 216 via the sensor hub 126. The cloud-based remote management module 224 may receive sensor data from interior sensors 206 via the gateway 106. The cloud-based remote management module 224 may receive electric measurement data (e.g., current and voltage measurements), tint level of a corresponding EC window 130, etc. from drivers 104 via the gateway 106. The cloud-based remote management module 224 may receive a signal (e.g., instructions to change tint level) from a tint selector via the gateway 106. The cloud-based remote management module 224 may receive one or more of status (e.g., fault, error, when last transmitted data, offline or online, etc.), mode, schedule, etc. from one or more components.

The cloud-based remote management module 224 may transmit instructions and receive data via the broker module 222.

The cloud-based remote management module 224 may determine portions of the data received (e.g., received via broker module 222) correspond to different identifiers (e.g., categories, labels, etc.). The cloud-based remote management module 224 may label (e.g., enrich with identifiers, add the identifiers to the portions of data, associate the portions of data with identifiers) the different portions of data with corresponding identifiers. The cloud-based remote management module 224 may store the different portions of data in corresponding databases in the cloud computing system 110. For example, the cloud-based remote management module 224 may determine sensor data from the exterior sensor 216 and interior sensor 206 correspond to the glare control identifier (e.g., for performing glare control) and may store the sensor data in a glare control database. In another example, the cloud-based remote management module 224 may determine that electric measurement data (e.g., current and voltage measurements) correspond to a long-term testing identifier are to be stored in a long-term testing database (e.g., for long-term data analysis, not to be included in activity feeds, etc.).

The cloud-based remote management module 224 may display (e.g., via a GUI displayed on dashboard web app 140, dashboard mobile app 142, etc.), a graphical representation of the components of the electrochromic window system 200. The cloud-based remote management module 224 may also display one or more of status, mode, tint level, schedule, etc. of the components of the electrochromic window system 200 (e.g., via the GUI).

The cloud-based remote management module 224 may receive a view request from a user device (e.g., via a GUI, via a dashboard web app 140, dashboard mobile app 142, etc.). The view request may correspond to a portion of the data received by the cloud-based remote management module 224 (e.g., and stored in a corresponding database). The cloud-based remote management module 224 may determine that the user device is authorized to view the portion of the data (e.g., the user device corresponds to an administrator, the user device corresponds to a user that is authorized to change the tint level of the EC windows corresponding to the first portion of the data, etc.). The cloud-based remote management module 224 may retrieve the portion of the data (e.g., from the corresponding database) and may cause the portion of the data to be displayed via the GUI. For example, responsive to receiving a request from a user device to view the tint level of each of the EC windows 130 (e.g., by opening GUI 400A of FIG. 4A), the cloud-based remote management module 224 may determine the user device is authorized to view the tint level of the EC windows 130, retrieve the portion of the data received corresponding to the most recent tint level of each of the EC windows 130, and display the portion of the data via the GUI (e.g., via GUI 400A of FIG. 4A).

Responsive to displaying the portion of the data via the GUI presented on a user device, the cloud-based remote management module 224 may receive a change request to implement a change associated with one or more EC windows 130. The user may transmit the change request by interacting with the GUI displayed responsive to the view request. The change request may be to change the tint level of one or more of the EC windows 130 (e.g., via user input via the GUI 400A of FIG. A to change the tint level of an EC window 130). The cloud-based remote management module 224 may cause a component of the electrochromic window system 200 to implement the change. For example, the cloud-based remote management module 224 may cause the gateway 106 to cause the EC windows to change tint level.

The cloud-based remoted management module 224 may receive a response from the component (e.g., gateway 106) that the change has been implemented (e.g., the tint level of the EC window 130 has been changed). The cloud-based remoted management module 224 may display an indication that the change was implemented via the GUI.

In some embodiments, the cloud-based remoted management module 224 performs troubleshooting via the GUI. The cloud-based remoted management module 224 may receive data from the components of the electrochromic window system 200. The cloud-based remote management module 224 may determine a portion of the data corresponds to faults or errors in the electrochromic window system 200. For example, the portion of the data may indicate that a component is offline, a component has not transmitted data for a threshold amount of time, an EC window 130 is not maintaining a tint level, there is a delay in receiving responses or acknowledgements from components, etc. The cloud-based remote management module 224 may store the portion of the data in a corresponding database. In some embodiments, the cloud-based remote management module 224 may provide an alert (e.g., via the GUI, via an email, etc.) indicating the portion of the data corresponding to faults or errors. In some embodiments, responsive to a view request (e.g., requesting the GUI display the faults or errors), the cloud-based remote management module 224 may retrieve the portion of the data from the database and display the portion of the data via the GUI. For example, the GUI may display a list of the components of the electrochromic window system 200 and the corresponding faults or errors. Responsive to receiving user input selecting the component, the cloud-based remoted management module 224 may display further details regarding the fault or error (e.g., one or more corrective actions, such as possible solutions, maintenance to be performed, components to be replaced, etc.) to cause the error or fault to be corrected.

Figure 3:
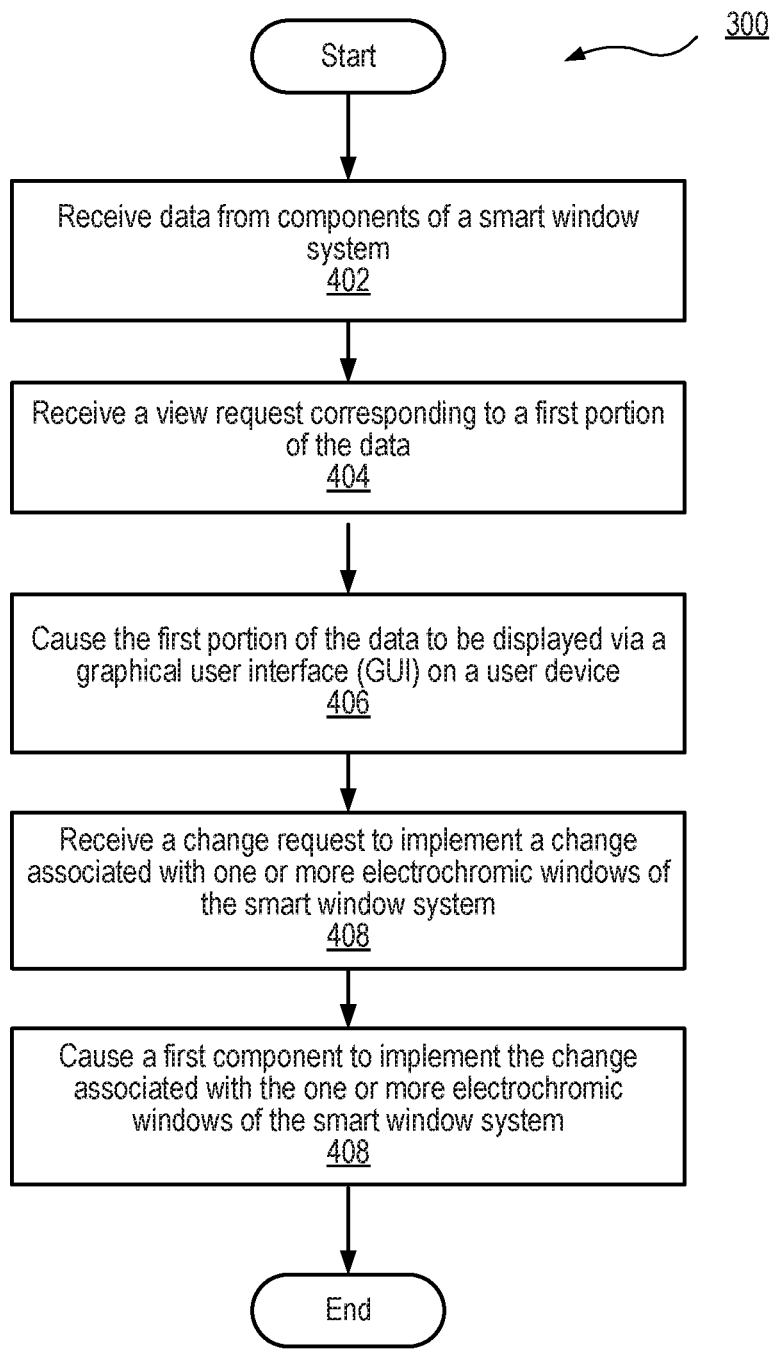
FIG. 3 is a flow diagram of a method of performing remote management of an electrochromic window system, according to certain embodiments.

FIG. 3 is a flow diagram of a method of performing cloud-based remote management, according to certain embodiments. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the cloud computing system 110 of FIG. 1 or FIG. 2. In another embodiment, the method 300 is performed by one or more server devices of the cloud computing system 110. In some embodiments, the method 300 is performed by a processing device of the cloud computing system 110. In some embodiments, the method 300 is performed by a cloud-based remote management module 224 of the cloud computing system 110. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 3, the method 300 begins at block 302 by the processing logic receiving data (e.g., a data stream) from a plurality of components of a smart window system (e.g., electrochromic window system 100 of FIG. 1 or 200 of FIG. 2). The components may include one or more of gateway 106, drivers 104, distributed EMS 102, EC windows 130, sensor hub 126, interior sensors 206, exterior sensors 216, range extender, etc. The data may include one or more of sensor data from one or more sensors, electrical measurement data (e.g., electrical current measurements, voltage measurements, etc.) from drivers 104, fault data indicating a fault of one or more of the components, test data (e.g., from long term tests of the components), tint level change data (e.g., when tint level of an EC window changed, how fast a tint level of an EC window changed, the current tint level of each of the EC windows, etc.), component status data (e.g., online, offline, mode, etc.), event data (e.g., updating software or firmware, percent updated, etc.), etc.

Responsive to receiving the data, the processing logic may determine a first portion of the data corresponds to a first identifier and a second portion of the data (e.g., electrical measurement data for long term data analysis) corresponds to a second identifier. The processing logic may associate (e.g., add, enrich, label) the first portion of the data with the first identifier, associate the second portion of the data with the second identifier, store the first portion of the data in a first database, and/or store the second portion of the data in a second database. In some embodiments, the processing logic has an identifier for sensor data to be used for the glare control algorithm and a corresponding database for that sensor data. In some embodiments, the processing logic has an identifier for electrical current and voltage data and a corresponding database for running long-term tests on that data. In some embodiments, the processing logic has an identifier for status of the components and a corresponding database to store status information. In some embodiments, the processing logic has an identifier for fault data and a corresponding database for fault data.

In some embodiments, upon receiving the data (e.g., data stream), the processing logic causes one or more applications (e.g., of the cloud-based remote management module 224) to retrieve portions of the data and to place the portions of the data in corresponding databases. For example, one application (e.g., associated with the glare control algorithm) of the cloud-based remote management module 224 may obtain sensor data from the data stream and place the sensor data in a database (e.g., associated with the glare control algorithm). The application may associate (e.g., add, enrich, label) the portion of the data from the data stream with a label or identifier prior to storing the portion of the data.

In some embodiments, the processing logic may store the first portion of the data in a relational database. The database may recognize relations among the stored data. For example, the database may recognize relationships between one or more of time, value, component, etc.

At block 304, the processing logic receives, via a GUI presented on a user device, a view request corresponding to a first portion of the data. In some embodiments, the view request is to view the status or mode of the components of the smart window system. In some embodiments, the view request is to view the tint level of the EC windows of the smart window system. In some embodiments, the view request is to view fault data of the components of the smart window system.

In some embodiments, responsive to receiving the view request, the processing logic may determine the view request corresponds to the first identifier and may retrieve the first portion of the data from a corresponding database (e.g., retrieve only data the corresponds to the first identifier from the database, retrieve all data from the database that only stores data corresponding to the first identifier).

The processing logic may determine that the view request corresponds to the first identifier and retrieve the first portion of the data (e.g., from the first database, based on the first identifier) without retrieving the second portion of the data At block 306, the processing logic causes at least a portion of the first portion of the data to be displayed via the GUI presented on the user device (e.g., causes the GUI to be modified to display at least a portion of the first portion of the data corresponding to the view request). In some embodiments, prior to causing at least a portion of the first portion of the data to be displayed via the GUI on the user device, the processing logic may determine the user device is authorized to view at least a portion of the first portion of the data. In some embodiments, the processing logic may determine the viewing permissions of the user making the view request. The processing logic may determine if at least a portion of the first portion of the data may be viewed by the user issuing the view request. In some embodiments, the processing logic may provide an alert that the user cannot view at least a portion of the portion of data corresponding to the view request. In some embodiments, the processing logic may further filter the data to only display data to which the user has permission to view. In some embodiments, the processing logic may display data to which the user has permission to view that is different from the portion of data corresponding to the view request. The processing logic may display different amounts or types of data based on whether the view request is received from an administrative portal or from a user portal.

In some embodiments, the processing logic (e.g., a queue microservice or application of the cloud-based remote management module 224) may receive a request for data (e.g., a ticket) from a dashboard desktop or mobile app (e.g., a request for on-site information from a non-on-site device). The processing logic may provide an identifier (e.g., ticket number) associated with the request to the dashboard desk or mobile app. The processing logic and may provide the request to a component (e.g., the gateway) of the smart window system and may receive a response from the component. The response may include the requested data. The dashboard desktop or mobile app may periodically request a status update on the request for data by providing the identifier to the processing logic. Upon receiving the response that includes the requested data, the processing logic may respond to the request for status update from the dashboard mobile or web app with the requested data.

In some embodiments, the processing logic (e.g., via a microservice or application of the cloud-based remote management module 224, via an API of the cloud-based remote management module 224) receives a request (e.g., from a dashboard web or mobile app, from glare control algorithm, etc.) for a portion of data and the processing logic retrieves the portion of the data from the corresponding database and provides the portion of the data (e.g., to the dashboard web or mobile app, glare control algorithm, etc.) to cause the data to be displayed via a GUI.

Responsive to the view request being a request to view activity of the components of the smart window system, the processing logic may display an activity feed of filtered data. In some embodiments, responsive to receiving data from the components, the processing logic may have removed portions of the data to generate filtered data to store in an activity feed database. The filtered data displayed via the activity feed may include one or more of tint level change data, sensor data, indication that the gateway synchronized with the cloud computing system, data corresponding to tinting EC windows in a scene or group configuration, an indication that configuration of components was updated, an indication of maintenance that was performed (e.g., mesh maintenance), indication of currently running events (e.g., updating software or firmware, status of updates), etc. The filtered data may not include electric measurement data (e.g., electric current measurements, voltage measurements, step voltage, etc.), network statistics, overall summary of nodes of the electrochromic window system, current tint level, sequestration, tests running on the wireless mesh networks, long-term tests, etc.

In some embodiments, the activity feed may be used by one or more other systems. For example, the BMS may use the activity feed (e.g., to confirm that the smart window system is functioning, for analysis of total building functionality, etc.). In some embodiments, the cloud computing system may be integrated with the BMS to automate changing of tint levels of EC windows based on HVAC systems, security systems, etc. of the building.

Responsive to the view request being a request to view status and/or mode of the components, the processing logic may display a list of the components and a current status and/or mode (e.g., see GUI 400A of FIG. 4A). The processing logic may display a visual indicator (e.g., color, border, highlight, etc.) of each type of status for the components (e.g., a first visual indicator for faults, a second visual indicator for online, etc.). Responsive to the view request being a request to view a schedule of one or more components of the smart window system, the processing logic may display a list of the one or more components and modes for each time frame corresponding to the schedule (e.g., see GUI 400B of FIG. 4B).

At block 306, the processing logic receives, via the GUI presented on the user device, a change request to implement a change associated with one or more EC windows of the smart window system. Block 306 may be in response to user interaction with the GUI that was modified based on the view request. In some embodiments, block 306 is subsequent to the causing of the first portion to be displayed via the GUI. In some embodiments, a change associated with one or more EC windows may include one or more of changing the tint level of the one or more electrochromic windows, changing settings of a component (e.g., gateway, driver, sensor hub, distributed EMS, etc.) associated with the one or more electrochromic windows, changing mode or schedule of a component associated with the one or more electrochromic windows, etc. The change request may be user input via the GUI displayed responsive to the view request (e.g., user input via the GUI to change a tint level responsive to the tint level being displayed via the GUI).

At block 308, the processing logic causes, by a processing device, a first component (e.g., gateway, sensor hub, etc.) of the plurality of components to implement the change (e.g., corresponding to the change request) associated with the one or more electrochromic windows of the smart window system. In some embodiments, the processing logic causes the gateway to implement the change (e.g., cause one or more drivers to change the tint level of the one or more electrochromic windows, change settings of the gateway, etc.). In some embodiments, the processing logic causes the sensor hub to implement the change (e.g., change settings of the sensor hub). In some embodiments, prior to causing the first component to implement the change associated with the change request received from a user device, the processing logic may determine the user device is authorized to implement the change in the smart window system.

In some embodiments, the processing logic may receive a response indicating that the change was implemented and may cause an indication that the change was implemented to be displayed via the GUI on the user device (e.g., display the updated tint level of the EC window via the GUI).

In some embodiments, the processing logic (e.g., queue module of the cloud-based remote management module 224) may receive a request (e.g., a change request to implement a change) to execute a scene via an API from a dashboard mobile app (e.g., executing on a user device). The processing logic (e.g., via the queue module) may give the dashboard mobile app a ticket identifier via the API. The dashboard mobile app may periodically request, via the API, a status update for the request corresponding to the ticket identifier. Upon receiving a confirmation from the gateway that the scene has executed, the processing logic (e.g., via the queue module) may respond to the subsequent status update request with a response that the scene has executed.

In some embodiments, the processing logic may receive a view request to view a schedule and may cause at least a portion of the schedule (e.g., for the next seven days) to be displayed via a GUI on the user device. The processing logic may receive a change request to change a mode for one or more time frames in the schedule to be changed and the processing logic may cause the change to the schedule to be implemented. The processing logic may receive data indicating that the schedule changed and store the data in a corresponding database (e.g., to be displayed via an activity feed). Upon implementing the change to the schedule, the processing logic may update the schedule displayed via the GUI.

FIGS. 4A-B illustrate GUIs 400 for cloud-based remote management, according to certain embodiments. GUIs 400 are examples and the look and feel of the GUIs 400 may vary. In some embodiments, at least a first portion of information in one or more of the FIGS. 4A-B may be obtained by receiving data from components of the smart window system. In some embodiments, at least a second portion of information in one or more of the FIGS. 4A-B may be input via user input (e.g., listing of components input during commissioning, etc.). In some embodiments, at least a third portion of information in one or more of the FIGS. 4A-B may be obtained based on one or more of a configuration file (e.g., of a driver, gateway, sensor hub, etc.), settings files (e.g., a schedule, rules, etc.), etc. In some embodiments, the cloud computing system 110 may cause a new component to be configured based on configurations (e.g., mode, schedule, etc. of a previous component) in one or more of FIGS. 4A-B. In some embodiments, the cloud computing system 110 may configure or update mode, tint level, schedule, etc. of components based on user input via one or more of FIGS. 4A-B. In some embodiments, the cloud computing system 110 may perform troubleshooting (e.g., provide alerts to the user) via one or more of FIGS. 4A-B (e.g., alert the user of a failed or faulty status of a component of the smart window system). In some embodiments, one or more of FIGS. 4A-B may display a current state (e.g., online, changing tint level, updating software or firmware, transmitted data within a threshold amount of time, etc.) of one or more of the components.

FIG. 4A is a GUI 400A that displays site architecture of an electrochromic window system (e.g., one or more of electrochromic window system 100 of FIG. 1, electrochromic window system 200 of FIG. 2, smart window system, etc.). A list of potential components (e.g., displayed via GUI 400A) for the site architecture may include location, façade, frame, cabinet, gateway, driver, EC window, tint selector (e.g., keypad), interior sensor (e.g., light sensor), distributed EMS, range extender, and sensor hub.

The components of the site architecture may be organized in a hierarchy (e.g., tree structure) and may be displayed via the GUI 400A. In some embodiments, under a location of the site (e.g., building, suite, office space, etc.), there may be a sensor hub, range extender, façade, interior sensor, and cabinet. In some embodiments, under a second location (e.g., floor), there may be third location (e.g., office) on that second location. The cabinet may include one or more of a driver 1, driver 2, gateway, or distributed EMS. The third location (e.g., office) may include a frame. The frame may include EC window 1 and EC window 2.

For one or more of the components displayed via GUI 400A, GUI 400A may display one or more of status, mode, tint level, etc.

The status may include one or more of online, offline, error or fault, updating (e.g., software, firmware, etc.), transmitted data to the cloud computing system within a threshold amount of time, changing tint level, etc.

The mode may be one or more of glare control mode (e.g., change tint level to avoid glare in eyes of people, eco mode (e.g., change tint level to lower energy consumption of HVAC system), manual mode (e.g., change tint level based on manual user input), machine learning mode (e.g., change tint level based on a trained machine learning model that was trained with training input of previous conditions and target output of the previous tint levels), security mode (e.g., clear all of the windows), occupied mode (e.g., glare control), unoccupied mode (e.g., eco mode), and so forth.

The tint level may be the percentage of tint level of the EC window (e.g., 0%, 25%, 50%, 75%, 100% tint level or 65%, 21%, 2% transmissivity or the like). The tint level may indicate one or more of whether the tint level is changing, speed of tinting, when the tint level changed or is to change, the previous tint level and the new tint level, etc.

The hierarchy in GUI 400A may include a tree structure, a name of each component, a first graphical element (e.g., pencil, "edit," etc.) for editing one or more of status, mode, tint level, etc. of a component, a second graphical element (e.g., an "x," "close," etc.) for disregarding edits to status, mode, tint level, etc. of a component, etc. By selecting a component, further details may be displayed. By selecting status, further details may be displayed (e.g., history of status, time of each status, faults, status of interest, etc.). By selecting mode, a list of available modes may be displayed for selection by the user. By selecting tint level, a list of available tint levels may be listed for selection by the user. GUI 400A may provide alerts of faults or errors and may provide possible solutions. For example, if a component is offline (e.g., has not transmitted data for a threshold amount of time, does not respond to requests from the cloud computing system), GUI 400A may display a status of offline and may provide possible solutions (e.g., an option to remotely reset the wireless mesh network, an indication of maintenance to be performed on-site, etc.).

FIG. 4B is a GUI 400B that displays a schedule for components of the smart window system, according to certain embodiments. A smart window system may have multiple schedules, such as one or more of a weekday schedule, a weekend and holiday schedule, a schedule for a specific time frame (e.g., season, month, week, day, time of day), a custom schedule (e.g., for special events), etc. The cloud computing system 110 (e.g., or gateway 106) may use a schedule for controlling tint level of EC windows 130. Each schedule may have a list of components, a time frame, and a mode for each time frame.

In some embodiments, the time frames of the schedule include work-hours and non-work hours. In some embodiments, the time frames of the schedule include daylight hours and non-daylight hours. In some embodiments, the time frames of the schedule are split into segments (e.g., sets of hours, sets of minutes, etc.). For example, the time frames in GUI 400B are split into midnight to 8 am, 8 am to 6 pm (e.g., workday hours, daylight hours, etc.), and 6 pm to midnight.

EC windows 130 may have a first mode during daylight hours (e.g., glare control mode, eco mode, etc.) and a different mode during non-daylight hours (e.g., all clear, all tinted, etc.). The sensor hub and gateway may have a first mode during daylight hours (e.g., send data more frequently to the cloud computing system 110) and a second mode during non-daylight hours (e.g., send data less frequently or not at all to the cloud computing system 110, perform software and firmware updates, etc.). The range extender, interior sensor, drivers, and distributed EMS may also have different modes during different times of the day (e.g., hibernate during non-daylight hours, etc.).

The hierarchy in GUI 400B may include a tree structure, a name of each component, a first graphical element (e.g., pencil, "edit," etc.) for editing one or more modes or one or more time frames of a component, and a second graphical element (e.g., an "x," "close," etc.) for disregarding edits to modes or time frames of a component, etc. By selecting a component, further details may be displayed. By selecting a mode, options of other modes may be displayed. By selecting a time frame, options of other types of time frames may be displayed. In some embodiments, GUI 400A of FIG. 4A displays the corresponding current schedule of one or more of the components.

Figure 5:
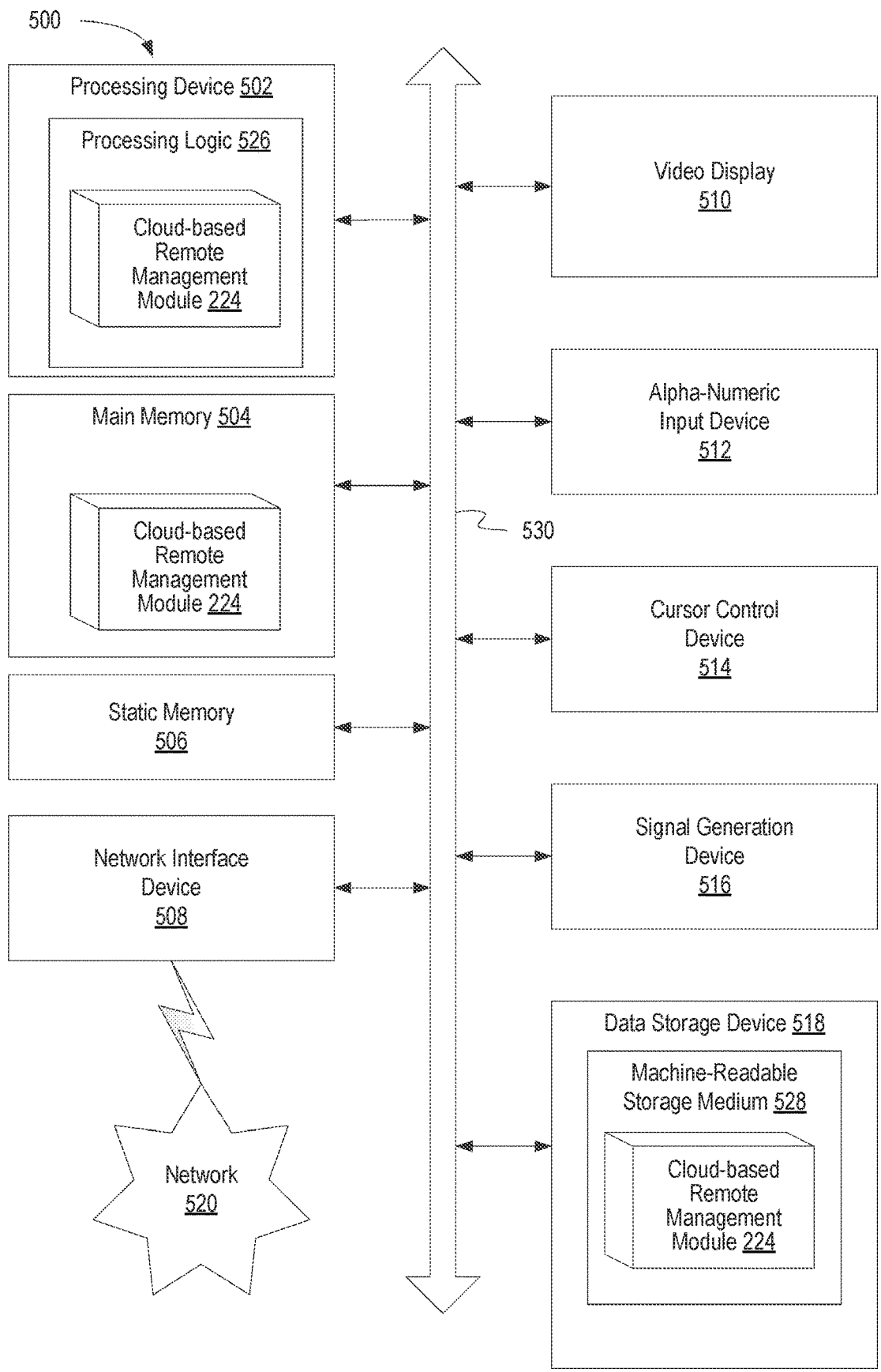
FIG. 5 illustrates a diagrammatic representation of a machine in the example form of a computer system including a set of instructions executable by a computer system for cloud-based remote management of an electrochromic window system according to any one or more of the methodologies discussed herein.

FIG. 5 illustrates a diagrammatic representation of a machine in the example form of a computer system including a set of instructions executable by a computer system 500 for cloud-based remote management according to any one or more of the methodologies discussed herein. In some embodiments, computer system 500 includes one or more server devices of a cloud computing system (e.g., cloud computing system 110 of one or more of FIGS. 1-3). The computer system 500 may have more or less components than those shown in FIG. 5 (e.g., one or more server devices of cloud computing system 110 may have fewer components than shown in computer system 500). In one embodiment, the computer system may include instructions to enable execution of the processes and corresponding components shown and described in connection with FIGS. 1-4.

In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein In some embodiments, the example computer system 500 (e.g., cloud computing system 110) includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530. In some embodiments, memory (e.g., main memory 504, data storage device 518, etc.) may be spread across one or more mediums (e.g., of an on-demand cloud computing platform).

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions for performing the operations and processes described herein (e.g., cloud-based remote management module 224, method 300 of FIG. 3, etc.).

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 (or machine-readable medium) on which is stored one or more sets of instructions embodying any one or more of the methodologies or functions described herein (e.g., cloud-based remote management module 224, method 300 of FIG. 3, etc.). The instructions may also reside, completely or at least partially, within the main memory 504 and/or within processing logic 526 of the processing device 502 during execution thereof by the computer system 500, the main memory 504 and the processing device 502 also constituting computer-readable media.

The instructions may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "causing," "determining," "associating," "labeling," "storing," "retrieving," "authorizing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving data from a plurality of components of a smart window system;
responsive to determining that a first portion of the data corresponds to a first identifier and a second portion of the data corresponds to a second identifier, storing the first portion of the data in association with the first identifier and storing the second portion of the data in association with the second identifier, wherein the first portion of the data is indicative of one or more faults of the smart window system;
receiving, via a graphical user interface (GUI) presented on a user device, a view request to view, via the GUI, a representation of at least a portion of the one or more faults of the smart window system;
responsive to determining that the view request corresponds to the first identifier, retrieving the first portion of the data without retrieving the second portion of the data;
causing the GUI to be modified to display, based on at least a portion of the first portion of the data corresponding to the view request, a list of at least a portion of the plurality of components of the smart window system and a fault corresponding to a component of the plurality of components;
receiving, via user interaction with the GUI that was modified based on the view request, a change request to implement a corrective action to correct the fault corresponding to the component of the smart window system; and
responsive to receiving the change request via the user interaction with the GUI, causing, by a processing device, performance of the corrective action to correct the fault corresponding to the component of the smart window system.

2. The method of claim 1, wherein:
the plurality of components comprises a gateway, a driver, and an electrochromic window; and
the causing of the performance of the corrective action comprises causing the gateway to cause the driver to change a corresponding tint level of the electrochromic window to correct the fault corresponding to the electrochromic window.

3. The method of claim 1, wherein:
the causing of the performance of the corrective action comprises causing a gateway to change one or more settings of the gateway; and
the gateway is to cause, based on the one or more settings, a driver to control a corresponding tint level of an electrochromic window of the smart window system.

4. The method of claim 1, wherein the second portion of the data comprises electrical measurement data from a plurality of drivers of the smart window system, wherein each of the plurality of drivers is configured to control a corresponding tint level of a corresponding electrochromic window of the smart window system.

5. The method of claim 1 wherein:
the storing of the first portion of the data in association with the first identifier comprises storing the first portion of the data in a first database;
the storing of the second portion of the data in association with the second identifier comprises storing the second portion of the data in a second database; and
the retrieving of the first portion of the data comprises retrieving the first portion of the data from the first database.

6. The method of claim 1, wherein:
the storing of the first portion of the data in association with the first identifier comprises labeling the first portion of the data with the first identifier; and
the storing of the second portion of the data in association with the second identifier comprises labeling the second portion of the data with the second identifier.

7. The method of claim 1 further comprising:
receiving a response indicating that the corrective action was implemented; and
causing an indication that the corrective action was implemented to be displayed via the GUI on the user device.

8. The method of claim 1 further comprising:
prior to the causing of the list of the at least a portion of plurality of components of the smart window system and the fault corresponding to the component of the plurality of components to be displayed via the GUI based on the at least a portion of the first portion of the data, determining the user device is authorized to access the at least a portion of the first portion of the data; and prior to the causing of the performance of the corrective action, determining the user device is authorized to implement the corrective action in the smart window system.

9. The method of claim 1, wherein the view request to view the representation of the at least a portion of the one or more faults of the smart window system is a request to view an activity feed of the first portion of the data associated with one or more of the plurality of components.

10. The method of claim 1, wherein:
the view request to view the representation of the at least a portion of the one or more faults of the smart window system is associated with viewing a corresponding fault associated with a corresponding mode of one or more of the plurality of components of the smart window system; and
the change request is to implement the corrective action associated with correcting the corresponding fault associated with the corresponding mode of the component.

11. The method of claim 1, wherein the fault corresponding to the component comprises an indication that one or more of:
the component is offline;
the component is not transmitting data for a threshold amount of time;
an electrochromic window is not maintaining a tint level; or
a delay in receiving a response or acknowledgement from the component.

12. The method of claim 1, wherein:
the view request to view the representation of the at least a portion of the one or more faults of the smart window system is associated with viewing a corresponding fault associated with a corresponding tint level of electrochromic window; and
the change request is to implement the corrective action associated with correcting the corresponding fault associated the corresponding tint level of the electrochromic window of the smart window system.

13. A non-transitory machine-readable storage medium storing instructions which, when executed cause a processing device to perform operations comprising:
receiving data from a plurality of components of a smart window system;
responsive to determining that a first portion of the data corresponds to a first identifier and a second portion of the data corresponds to a second identifier, storing the first portion of the data in association with the first identifier and storing the second portion of the data in association with the second identifier, wherein the first portion of the data is indicative of one or more faults of the smart window system;
receiving, via a graphical user interface (GUI) presented on a user device, a view request to view, via the GUI, a representation of at least a portion of the one or more faults of the smart window system;
responsive to determining that the view request corresponds to the first identifier, retrieving the first portion of the data without retrieving the second portion of the data;
causing the GUI to be modified to display, based on at least a portion of the first portion of the data corresponding to the view request, a list of at least a portion of the plurality of components of the smart window system and a fault corresponding to a component of the plurality of components;
receiving, via user interaction with the GUI that was modified based on the view request, a change request to implement a corrective action to correct the fault corresponding to the component of the smart window system; and
responsive to receiving the change request via the user interaction with the GUI, causing performance of the corrective action to correct the fault corresponding to the component of the smart window system.

14. The non-transitory machine-readable storage medium of claim 13, wherein:
the plurality of components comprises a gateway, a driver, and an electrochromic window; and
the causing of the performance of the corrective action comprises causing the gateway to cause the driver to change a corresponding tint level of the one or more electrochromic window to correct the fault corresponding to the electrochromic window.

15. The non-transitory machine-readable storage medium of claim 13, wherein:
the causing of the performance of the corrective action comprises causing a gateway to change one or more settings of the gateway; and
the gateway is to cause, based on the one or more settings, a driver to control a corresponding tint level of an electrochromic window of the smart window system.

16. The non-transitory machine-readable storage medium of claim 13, wherein the second portion of the data comprises electrical measurement data from a plurality of drivers of the smart window system, wherein each of the plurality of drivers is configured to control a corresponding tint level of a corresponding electrochromic window of the smart window system.

17. The non-transitory machine-readable storage medium of claim 13, wherein:
the storing of the first portion of the data in association with the first identifier comprises storing the first portion of the data in a first database;
the storing of the second portion of the data in association with the second identifier comprises storing the second portion of the data in a second database; and
the retrieving of the first portion of the data comprises retrieving the first portion of the data from the first database.

18. A system comprising:
a memory; and
a processing device communicably coupled to the memory, the processing device to:
receive data from a plurality of components of a smart window system;
responsive to determining that a first portion of the data corresponds to a first identifier and a second portion of the data corresponds to a second identifier, store the first portion of the data in association with the first identifier and store the second portion of the data in association with the second identifier, wherein the first portion of the data is indicative of one or more faults of the smart window system;
receive, via a graphical user interface (GUI) presented on a user device, a view request to view, via the GUI, a representation of at least a portion of the one or more faults of the smart window system;

responsive to determining that the view request corresponds to the first identifier, retrieve the first portion of the data without retrieving the second portion of the data;

cause the GUI to be modified to display, based on at least a portion of the first portion of the data corresponding to the view request, a list of at least a portion of the plurality of components of the smart window system and a fault corresponding to a component of the plurality of components;

receive, via user interaction with the GUI that was modified based on the view request, a change request to implement a corrective action to correct the fault corresponding to the component; and responsive to receiving the change request via the user interaction with the GUI, cause performance of the corrective action to correct the fault corresponding to the component of the smart window system.

19. The system of claim 18, wherein:

the plurality of components comprises a gateway, a driver, and an electrochromic window; and to cause the performance of the corrective action, the processing device is to cause the gateway to cause the driver to change a corresponding tint level of the electrochromic window to correct the fault corresponding to the electrochromic window.

20. The system of claim 18, wherein:

to cause the performance of the corrective action, the processing device is to cause a gateway to change one or more settings of the gateway; and the gateway is to cause, based on the one or more settings, a driver to control a corresponding tint level of an electrochromic window of the smart window system.

* * * * *